(12) United States Patent
Priest et al.

(10) Patent No.: US 8,951,489 B2
(45) Date of Patent: Feb. 10, 2015

(54) COST CONTROL FOR CO$_2$ CAPTURE

(75) Inventors: Jonathan Priest, Charlotte, NC (US);
Bill Richardson, Harrisburg, NC (US);
Dennis W. Johnson, Simpsonville, NC (US)

(73) Assignee: Fluor Technologies Corporation, Aliso Viejo, CA (US)

( * ) Notice: Subject to any disclaimer, the term of this patent is extended or adjusted under 35 U.S.C. 154(b) by 0 days.

(21) Appl. No.: 14/116,297

(22) PCT Filed: May 11, 2012

(86) PCT No.: PCT/US2012/037488
§ 371 (c)(1),
(2), (4) Date: Feb. 5, 2014

(87) PCT Pub. No.: WO2012/155033
PCT Pub. Date: Nov. 15, 2012

(65) Prior Publication Data
US 2014/0140914 A1    May 22, 2014

Related U.S. Application Data

(60) Provisional application No. 61/484,856, filed on May 11, 2011.

(51) Int. Cl.
*B01D 53/50* (2006.01)
*B01D 53/62* (2006.01)
(Continued)

(52) U.S. Cl.
CPC .............. *F01N 3/0807* (2013.01); *B01D 53/50* (2013.01); *B01D 53/62* (2013.01); *B01D 53/75* (2013.01); *B01D 53/1475* (2013.01); *Y02C 10/08* (2013.01); *B01D 2257/504* (2013.01);
(Continued)

(58) Field of Classification Search
USPC .......... 423/220, 242.1, DIG. 6; 422/168, 169, 422/187, 600
See application file for complete search history.

(56) References Cited

U.S. PATENT DOCUMENTS 3,553,936 A   1/1971   Little et al.
7,255,842 B1  8/2007   Yeh et al.
(Continued)

OTHER PUBLICATIONS

Patent Cooperation Treaty, "Notification of Transmittal of the International Search Report and the Written Opinion of the International Searching Authority, or the Declaration", PCT Application No. PCT/US12/37488, issued Aug. 10, 2012.

*Primary Examiner* — Timothy Vanoy
(74) *Attorney, Agent, or Firm* — Fish & Tsang, LLP

(57) ABSTRACT

A flue gas treatment process and system is presented. The system includes a fan capable of moving a flue gas through a flue gas desulfurizer, direct contact cooler, and CO$_2$ absorber, without the need for a booster fan. The system also includes a direct contact cooler and CO$_2$ absorber that are configured to withstand gas conditions present at the flue gas desulfurizer exit. When the direct contact cooler and CO$_2$ absorber are shutdown, the speed of the fan is lowered and the flue gas continues to flow through the cooler and CO$_2$ absorber and out a chimney. The overall cost of installing, operating, and maintaining the system is lower than that of conventional processes and systems.

12 Claims, 4 Drawing Sheets

(51) Int. Cl.
*B01D 53/74* (2006.01)
*F01N 3/08* (2006.01)
*B01D 53/75* (2006.01)
*B01D 53/14* (2006.01)

(52) U.S. Cl.
CPC ........ *B01D 2258/0283* (2013.01); *Y02C 10/04* (2013.01); *Y02C 10/06* (2013.01); *Y10S 423/06* (2013.01)
USPC .................. 423/220; 423/242.1; 423/DIG. 6; 422/168; 422/169; 422/187; 422/600

(56) References Cited

U.S. PATENT DOCUMENTS

| | | |
|---|---|---|
| 2009/0101868 A1 | 4/2009 | Zhang et al. |
| 2010/0275781 A1 | 11/2010 | Tsangaris et al. |
| 2013/0129588 A1* | 5/2013 | Johnson et al. ............... 423/220 |
| 2013/0139738 A1* | 6/2013 | Grubbstrom et al. ......... 110/205 |
| 2014/0050651 A1* | 2/2014 | Xu et al. ....................... 423/420 |

* cited by examiner

COST CONTROL FOR CO₂ CAPTURE

This application claims the benefit of priority to application Ser. No. 61/484,856, filed on May 11, 2011. This and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTIVE SUBJECT MATTER

The field of the inventive subject matter is post-combustion flue gas treatment, more specifically, $CO_2$ capture and removal from flue gases.

BACKGROUND

Fossil fuel combustion is an important source of power generation, and provides a major portion of the world's power demands. Unfortunately, fossil fuel combustion is also a major contributor of pollutants to the atmosphere and environment. The exhaust gases that result from burning fossil fuels, called "flue gases," contain many harmful air pollutants, such as nitrogen oxides, sulfur dioxide, carbon dioxide, volatile organic compounds and heavy metals.

Various environmental regulations mandate treatment of flue gas, such as sulfur dioxide ($SO_2$) and carbon dioxide ($CO_2$) capture and removal. These treatment processes can greatly increase the cost of power production, resulting in higher prices to the consumer. Improved techniques, processes, and devices for treating flue gases help to control and reduce the increasing costs of power production.

U.S. Pat. No. 7,255,842 to Yeh teaches a process for removing sulfur oxides, nitrous oxides, and carbon dioxide from flue gases without producing harmful byproducts and while achieving low energy consumption. While Yeh appreciates the need to reduce operational costs, Yeh fails to appreciate that the net costs of building, operating, and maintaining a power plant can be lowered despite a moderate raise in operational costs. Of particular importance to the present application, Yeh fails to appreciate that a single fan system consuming high amounts of energy can actually reduce overall costs compared to a system that utilizes two fans that consume a lower amount of energy than the single fan.

There is still a need for improved processes and systems for post-combustion treatment of flue gases that reduce the net costs of power production.

SUMMARY OF THE INVENTIVE SUBJECT MATTER

The inventive subject matter provides apparatus, systems and methods in which a post-combustion flue gas treatment system is simplified by eliminating various components, such as fans, bypass conduits, and related components.

In one aspect of some embodiments, the system includes a boiler, flue gas desulfurizer (FGD) unit, direct contact cooler (DCC) unit, $CO_2$ absorber, and chimney, all fluidly connected. The FGD unit is configured to remove $SO_2$ from flue gas passing through the desulfurizer to produce desulfurized flue gas. The DCC unit is configured to cool the desulfurized flue gas passing through the cooler to produce a cooled desulfurized flue gas. The $CO_2$ absorber is configured to remove $CO_2$ from the cooled desulfurized flue gas passing through the absorber to produce a treated gas that has reduced amounts of $CO_2$ and $SO_2$. A fan is fluidly connected to the FGD unit and is configured to provide sufficient pressure to move flue gas through the FGD unit, DCC unit, $CO_2$ absorber, and chimney without the need for a second fan.

In another aspect of some embodiments, the DCC unit, $CO_2$ absorber, and all the conduits located downstream from the FGD unit are configured to withstand desulfurized flue gas conditions that are present at an exit of the FGD unit. The desulfurized flue gas conditions can comprise a temperature in the range of 120° F.-250° F., an acidity in the range of 1-5 pH, and a humidity in the range of 50%-100%. However, desulfurized flue gas conditions exceeding those ranges are also contemplated.

Unless the context dictates the contrary, all ranges set forth herein should be interpreted as being inclusive of their endpoints and open-ended ranges should be interpreted to include commercially practical values. Similarly, all lists of values should be considered as inclusive of intermediate values unless the context indicates the contrary.

In some embodiments, the fan is located in the fluid pathway connecting the boiler and the desulfurizer. In other embodiments, the fan is located in the conduit connecting the DDC unit and the $CO_2$ absorber.

From a methods perspective, the inventive subject matter provides a method of operating a power plant comprising adjusting a speed or vane position of a fan as a function of an operational parameter (e.g., on or off) of a direct contact cooler and a $CO_2$ absorber. The fan provides sufficient pressure to move flue gas through the desulfurizer fluidly, direct contact cooler, and $CO_2$ absorber when the direct contact cooler and $CO_2$ absorber are in an operational state, without the help of a second fan. The method can further include the step of modifying the direct contact cooler and $CO_2$ absorber to better withstand the gas conditions present at the desulfurizer exit.

In other aspects, the inventive subject matter provides a method of simplifying a power plant comprising: (i) configuring a first fan to provide sufficient pressure to move a flue gas through a flue gas desulfurizer, direct contact cooler, and $CO_2$ absorber, without the need for a second fan; (ii) configuring the direct contact cooler and $CO_2$ absorber to withstand flue gas conditions present at an exit of the flue gas desulfurizer; (iii) optionally removing a second fan fluidly connected to the flue gas desulfurizer, direct contact cooler, and $CO_2$ absorber; and (iv) optionally removing a bypass conduit fluidly connecting the flue gas desulfurizer to a chimney.

Various objects, features, aspects and advantages of the inventive subject matter will become more apparent from the following detailed description of preferred embodiments, along with the accompanying drawing figures in which like numerals represent like components.

DETAILED DESCRIPTION

One should appreciate that the disclosed techniques provide many advantageous technical effects including reducing costs for power production processes and systems.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Figure 1:
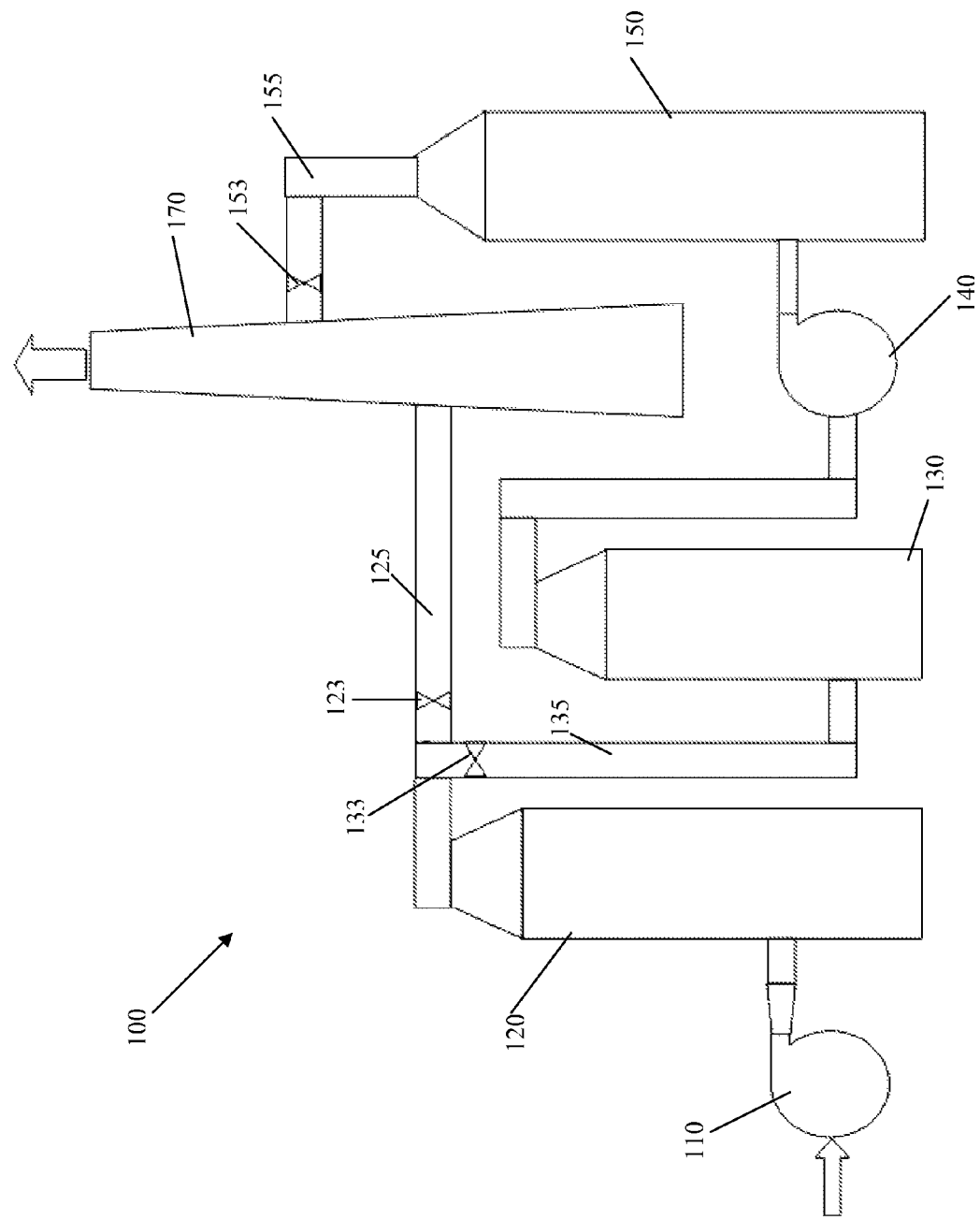
FIG. 1 is a schematic of a flue gas treatment process with two fans and a bypass conduit.

FIG. 1 shows a post-combustion flue gas treatment system 100, which is capable of capturing and removing $SO_2$ and $CO_2$ from flue gases. System 100 comprises an induced draft fan 110 downstream from a boiler (not shown) and upstream from a flue gas desulfurizer (FGD) 120. Fan 110 is configured to move flue gas from the boiler (not shown) into the FGD 120. Fan 110 is also configured to move flue gas from FGD 120 and out of system 100 into the atmosphere via bypass conduit 125 and chimney 170 when damper 133 is closed and damper 123 is open. However, when damper 123 is closed and damper 133 is open, fan 110 is not configured to provided sufficient pressure to move the flue gas into direct contact cooler (DCC) 130.

FGD 120 is configured to remove $SO_2$ from the flue gas as the flue gas passes through it. Various desulfurizer configurations are known in the art. Examples of desulfurizers can be found in U.S. Pat. Nos. 7,524,470, 7,625,537, 6,936,231, 7,052,662, 7,048,899, 6,991,771, 6,605,263, 6,132,692, and U.S. Patent Application Publication Nos. 2004/0105802, 2003/0175190, 2003/0108472, 2003/0108469, 2003/0108466, which are all incorporated herein by reference. FGD 120 can be configured in any fashion that is suitable for removing at least some $SO_2$ from the flue gas. The particular configuration of FGD 120 is not intended to limit the inventive subject matter taught herein. In some embodiments, the FGD unit is configured to produce a gas that is substantially free of $SO_2$.

Direct contact cooler (DCC) 130 is fluidly connected to FGD 120 via conduit 135. DCC 130 is configured to prepare flue gases for $CO_2$ removal by decreasing the flue gas temperature, thus increasing flue gas density. A booster fan 140 is located just downstream of DCC 130 and upstream of $CO_2$ absorber 150. Due to the pressure resistance in DCC 130 and absorber 130, fan 140 is included in order to pull flue gas out of DCC 130 and into absorber 150. Fan 140 then pushes the flue gas through absorber 150 into chimney 170 and out of system 100. Fan 140 is especially configured to blow wet flue gases having low temperatures and high densities, whereas fan 110 is configured to blow dry flue gases having high temperatures and low densities. Fans can be configured by selecting appropriate parameters (e.g., size, power, shape, etc.) to meet the necessary operational requirements.

Various sizes and configurations of direct contact coolers/condensers and $CO_2$ absorbers are known in the art. DCC 130 and $CO_2$ absorber 150 can be configured in any fashion suitable for removing at least some $CO_2$ from the flue gas.

Dampers 123, 133, and 153 are provided in various conduits throughout the system in order to control the flue gas pathway. When damper 123 is closed and 133 is open, the flue gas travels through FGD 120, DCC 130, absorber 150, and chimney 170. In this manner, both $SO_2$ and $CO_2$ are removed from the flue gas before leaving the system and entering the earth's atmosphere. During power production it is often desirous to shut down $CO_2$ removal processes while continuing $SO_2$ removal. This can be achieved by closing damper 133 and opening damper 123, thus allowing the flue gas to pass through FGD 120, conduit 125, and chimney 170 into the atmosphere, while bypassing DCC 130 and absorber 150.

It has yet to be appreciated that that various components can be eliminated from the typical post-combustion system in order to reduce costs. In particular, prior flue gas treatment processes and systems have failed to appreciate that fan 140 can be eliminated by configuring fan 110 to provide enough pressure and force to overcome the pressure resistance in DCC 130 and absorber 150 and blow the flue gas through absorber 150 and out chimney 170, while still reducing overall power product costs. By eliminating the need for a second fan, the costs of various mechanical and electrical systems associated with the second fan are also eliminated, including maintenance expenses.

One reason why prior systems have failed to appreciate this approach is because fans operate more efficiently when moving cold and condensed gas, as opposed to hot gases. Thus, from a pure cost-of-operation perspective, it is more efficient to include two fans wherein one of the fans is located in a cold gas pathway, rather than merely operating one larger fan in a hot gas pathway. However, due to the high costs associated with installing and maintaining a second fan, it unexpectedly turns out that the overall costs will be reduced when one larger and less efficient fan is used in a hot gas pathway.

Prior systems and processes have also failed to appreciate that bypass conduit 125 can be removed from the system and the flue gas can simply travel through DCC 130 and absorber 150, regardless of whether DCC 130 and absorber 150 are running or shut down. By eliminating the need for a bypass conduit, various costs associated with the bypass conduit are eliminated, such as damper 123, entrance to chimney 170, and related electrical systems. Eliminating the need for these various components significantly reduces the cost of installing and maintaining the system.

There are at least two reasons why prior designers of flue gas treatment systems have failed to appreciate that a bypass conduit can be eliminated from a post-combustion flue gas treatment system. First, allowing flue gas to pass through DCC 130 and absorber 150 even when those components are not in operation prevents personnel from easily accessing DCC 130 and absorber 150 for maintenance. Second, DCC 130, absorber 150, and other components downstream of DCC 130 are generally not configured to withstand hot flue gas conditions and do not meet National Fire Protection Association (NFPA) codes and standards. Thus, removing a bypass would require these components to be retrofitted to meet NFPA code. Despite these disadvantages, it unexpectedly turns out that the cost savings from removing the bypass is greater than the costs associated with retrofitting the downstream components. Prior designers of flue gas treatment plants have failed to recognize and explore this possibility.

Figure 2:
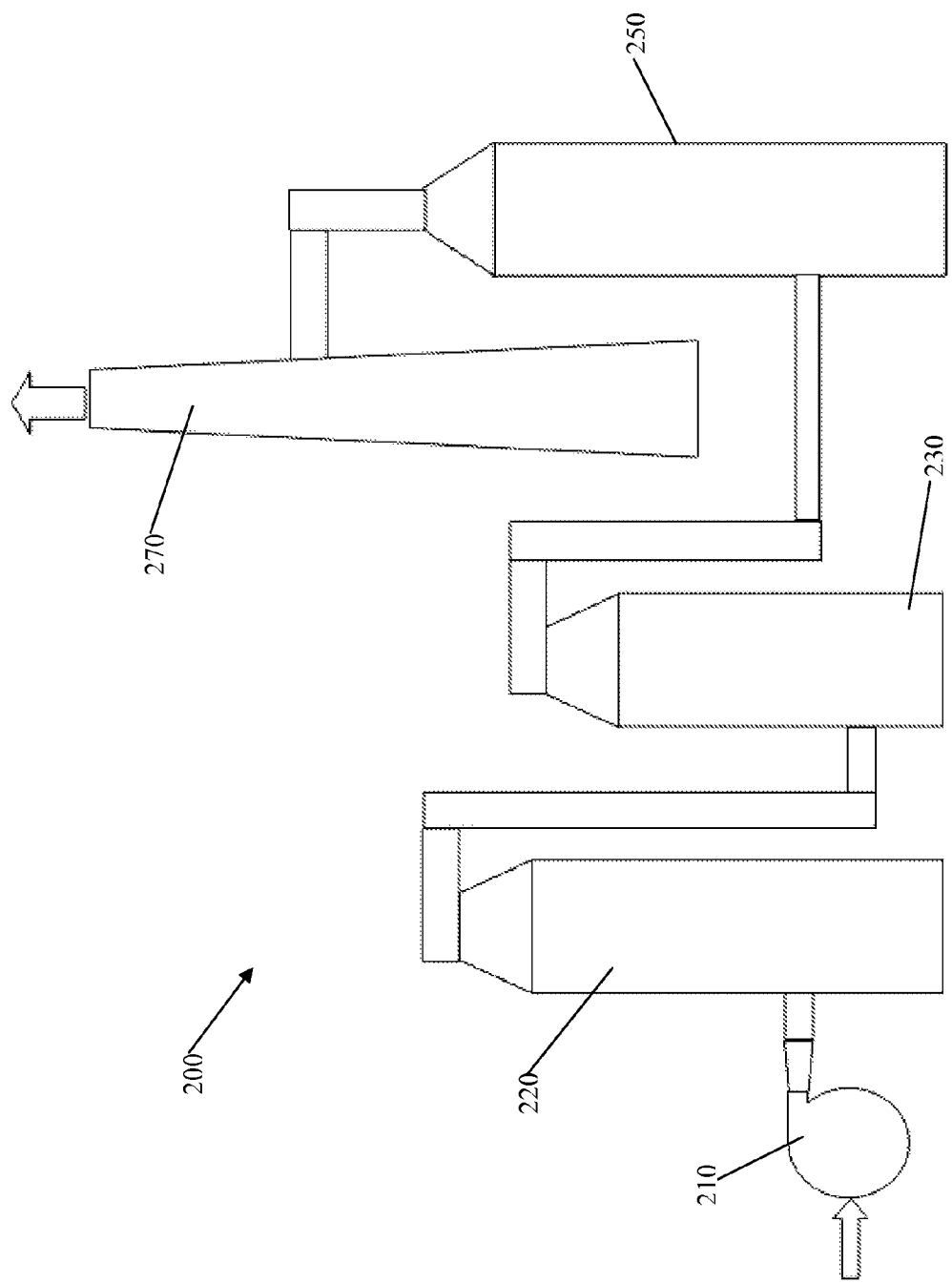
FIG. 2 is a schematic of a flue gas treatment process that has only one fan and no bypass conduit.

FIG. 2 shows a post-combustion flue gas treatment system 200, which is one embodiment of the inventive subject matter taught herein. Unlike system 100, system 200 does not have a booster fan 140, bypass conduit 125, and dampers 133, 123. Other various related components such as electrical systems related to the dampers and booster fan (not shown) and a chimney entrance fitting for a bypass conduit (not shown) have also been removed.

Fan 210 of system 200 has been configured to provide more force and pressure than that provided by fan 110 in system 100, due to the fact that fan 210 alone must move the flue gas through the entire post-combustion system, without the assistance of a booster fan 140. By eliminating the need for a booster fan 140, the costs of fluework, foundation, motor controls, switchgear, process controls, and other electrical and mechanical processes associated with a booster fan have also been eliminated. Thus, while fan 210 will generally consume more power than fan 110 and fan 140 combined (see FIG. 1) when DCC 230 and absorber 250 are operating, the overall cost of installing, maintaining, and operating system 200 has been significantly reduced compared to the costs of system 100.

Fan 210 is also configured to operate at different speeds, depending on whether $CO_2$ removal is performed. When $CO_2$ removal is not desired, DCC 230, absorber 250, and their related processes (e.g., solvent flow to the absorber), are turned off. Since DCC 230 is not operating to condense water and cool the flue gases and absorber 250 is not operated to capture $CO_2$, there will be essentially little pressure resistance created inside DCC 230 and absorber 250 and thus, fan 210 can be set to a lower speed to reduce power consumption. When $CO_2$ removal is desired, DCC 230 and absorber 250 are turned on and fan 210 is set to a higher speed.

Since a bypass conduit has been eliminated from the design of system 200, flue gases will continue to flow through DCC 230 and absorber 250, regardless of whether $CO_2$ capture is performed. DCC 230, absorber 250, and other components downstream of the FGD 220 are configured to withstand the conditions of the hot and wet flue gases exiting FGD 220. As used herein, "configured to withstand" means especially configured to resist the structurally destructive properties of the flue gas (e.g., higher temperatures, thermal expansion, and wet saturated gas stream, corrosion due to acidity due to the presence of $SO_2$, $SO_3$, Cl, and other acid gases, and potential deposition associated with carryover from the desulfurizer 220).

The conditions of the flue gas exiting the FGD 220 will depend primarily upon the type of desulfurizer and the fuel. For a low moisture fuel and a wet desulfurizer, flue gas temperatures at the desulfurizer exit can be as low as 120° F. For a dry or semi-dry desulfurizer, flue gas temperatures can range from 20° F. to 50° F. higher than the adiabatic saturation temperature, resulting in a 130° F. to 200° F. flue gas temperature range. Wet desulfurizers will also typically produce flue gas having near 100% humidity conditions having carryover water, ash, and scrubber oils. Condensed water present in the wet desulfurizer flue gas can have a pH below 5, and even in the 1-2 pH range, due to trace amounts of acids (Cl, $SO_2$, $SO_3$, HF, and even $CO_2$) which are frequently present in flue gases. Dry and semi-dry desulfurizers typically have a humidity of 50% or higher, and any condensed water will have pH values similar to that of wet desulfurizer flue gases, due to trace amounts of residual acids. The dry desulfurizer will typically have much less ash and dust particles present in the flue gas exiting the flue gas desulfurizer than a wet desulfurizer, since a fabric filter can be utilized just downstream of the dry desulfurizer.

The downstream components are also preferably configured to meet the standards and codes of the NFPA. By configuring these downstream components appropriately, the need for a bypass, a second chimney entrance, dampers, and other related components, has been eliminated. Thus, even though downstream components in system 200 may require special adaptations in order to withstand flue gas conditions and meet NFPA codes, the overall cost of installing, maintaining, and operating system 200 is lower than that of system 100 due to the savings associated with a simplified design.

Figure 3:
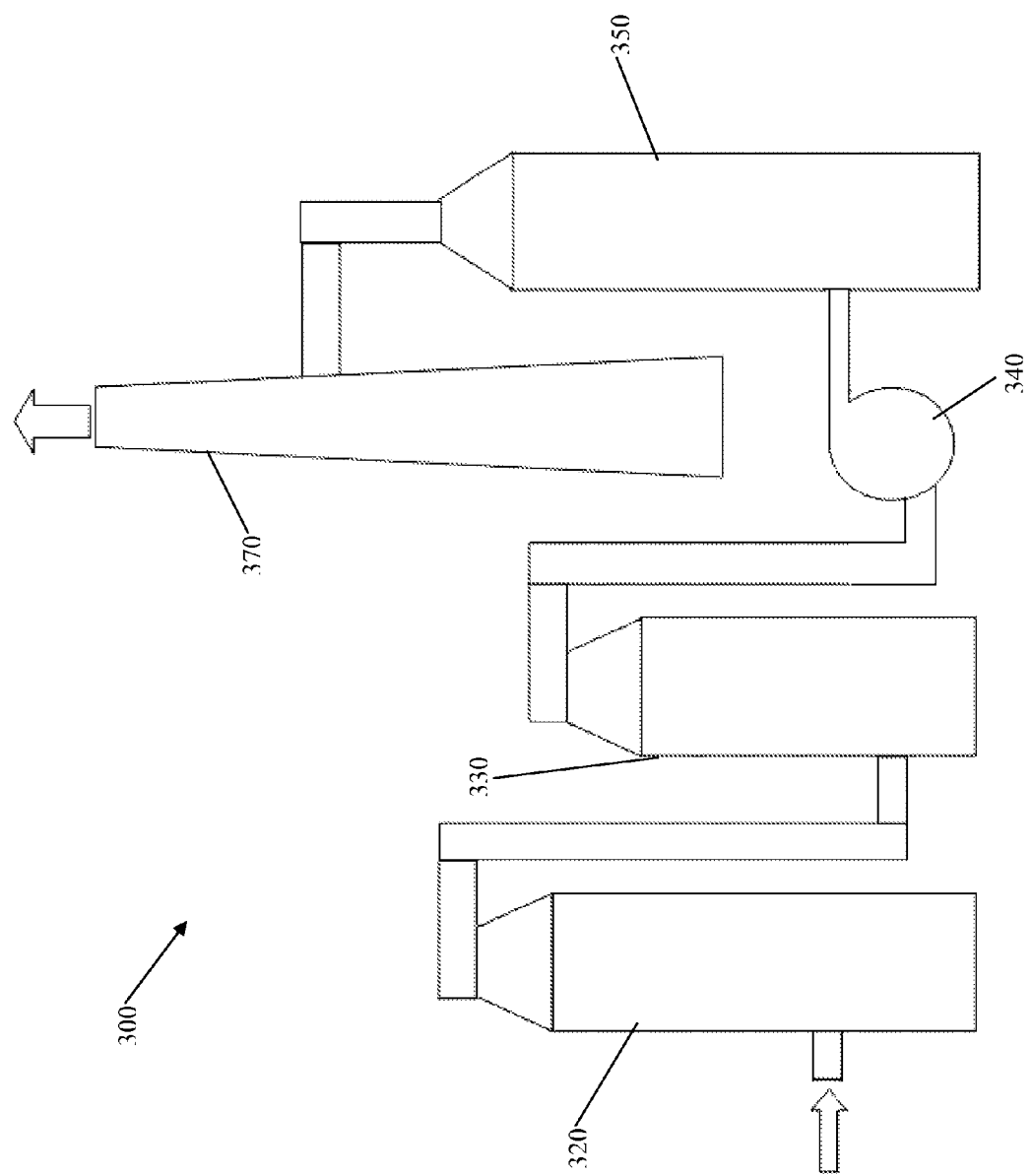
FIG. 3 is a schematic of another embodiment of a flue gas treatment process with only one fan and no bypass conduit.

FIG. 3 shows a post-combustion flue gas treatment system 300, which is yet another embodiment of the present inventive subject matter. System 300 is similar to system 200 except that the induced draft fan has been relocated to between direct contact cooler 330 and $CO_2$ absorber 350. Fan 340 is configured to provide enough pressure and force such that the flue gas exiting a boiler (not shown) is pulled into FGD 320 and DCC 330, and pushed through absorber 350 and chimney 370, without the need for a booster fan. When $CO_2$ removal processes are shut down, hot and wet flue gases will flow through DCC 330, fan 340, absorber 350, and chimney 370. These downstream components have all been configured to withstand the hot and wet flue gas conditions that are present in flue gases exiting a desulfurizer. Fan 340 is also configured to operate at different speeds, depending on whether $CO_2$ capture processes are turned on or shut off. Unlike fan 210 of system 200, fan 340 is located downstream of the direct contact cooler. This allows fan 210 to operate more efficiently than fan 210 when $CO_2$ removal processes are turned on, since fan 340 will be operating to move cooled and condensed gases. Thus, system 300 will have lower operating costs than system 200 when $CO_2$ removal is performed.

One of ordinary skill in the art will appreciate that system 300 can also be configured to include an induced draft fan just upstream of FGD 320. In this case fan 340 acts as a booster fan located downstream of DCC 330. While such a system would not provide all the cost savings of the present system 300, such a system would provide significant cost savings over system 100 since the bypass conduit, and equipment associated with the bypass conduit (e.g., dampers, second entrance to chimney) are eliminated. By including an induced draft fan, the power consumption of fan 340 will be reduced since fan 340 can be set to lower speeds. Such a system can also be configured to turn off one of the two fans when $CO_2$ removal processes are shut off.

Figure 4:
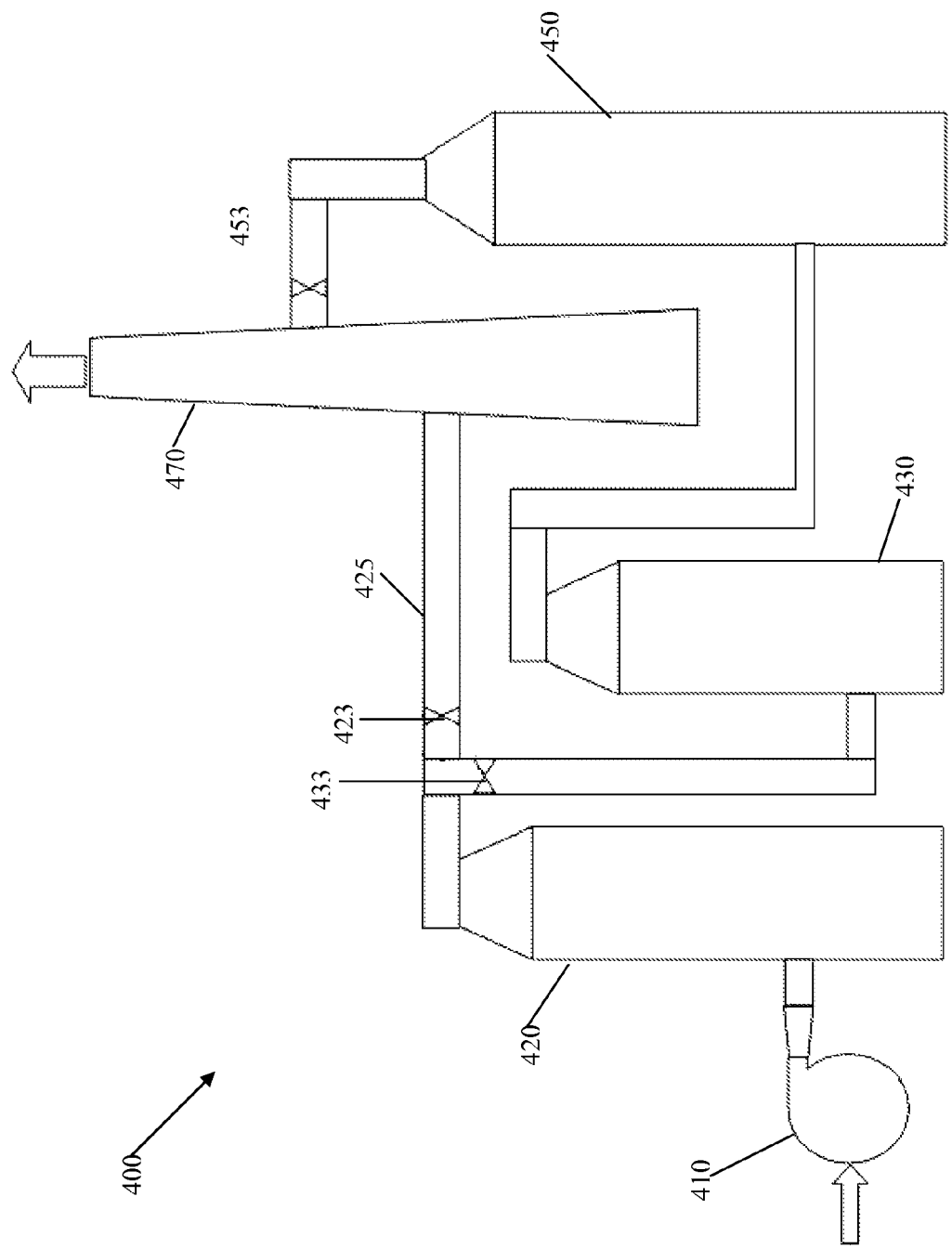
FIG. 4 is a schematic of a flue gas treatment process that has one fan and a bypass conduit.

FIG. 4 shows a post-combustion flue gas treatment system 400, which is another embodiment of the present inventive subject matter. System 400 is similar to system 200, except that system 400 also has a bypass conduit 425 and dampers 423, 433, and 453. Fan 410 is configured to operate at different speeds, depending on whether the $CO_2$ removal is performed. DCC 430 and absorber 450 can optionally be configured to meet NFPA codes. Thus, although system 400 does not provide all the cost savings of 200, system 400 nonetheless provides cost savings over system 100 due to the absence of a booster fan.

One of ordinary skill in the art will appreciate that there are physical limitations on fan sizes such that, for large installations, fan 110, 140, 210, 340 and 430 could actually be a set of smaller fans all positioned is the same position in the gas path.

Another aspect of the inventive subject matter is a method of operating a plant by adjusting the speed or vane position of a fan as a function of whether the direct contact cooler and $CO_2$ absorber are turned on or shut off depending upon the type of fan (e.g., axial or centrifugal). The fan is configured to provide sufficient pressure to move flue gas through the flue gas desulfurizer, contact cooler and $CO_2$ absorber without the need for a second fan when the direct contact cooler and $CO_2$ absorber are turned on. When said components are turned on, the fan can be adjusted to a faster speed or an appropriate vane position; when said components are shut off, the fan can be adjusted to a slower speed or the vanes can be repositioned in order to conserve power consumption.

Yet another aspect of the inventive subject matter is a method of simplifying a power plant by (i) configuring a fan to provide sufficient pressure to move flue gas through a flue gas desulfurizer, direct contact cooler, and $CO_2$ absorber, without the need for a second fan, and (ii) configuring the direct contact cooler and $CO_2$ absorber to withstand flue gas conditions present at the flue gas desulfurizer exit. Thus, the power plant is simplified by eliminating the need for a second fan and bypass conduit.

Those of skill in the art will appreciate that the inventive concepts disclosed herein can be applied to processes other than $SO_2$ and $CO_2$ removal from post-combustion flue gases. Other gases having unwanted constituents may be treated and/or conditioned using gas conditioning units (e.g., absorbers, coolers, desulfurizers, etc.) and processes that are appropriate for the given application, while still incorporating the inventive subject matter of this application.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A post-combustion flue gas treatment system comprising:
   a flue gas desulfurizer configured to remove $SO_2$ from flue gas passing through the desulfurizer and to produce desulfurized flue gas;
   a direct contact cooler fluidly connected to, and downstream from, the flue gas desulfurizer via a first conduit, wherein the cooler is configured to cool the desulfurized flue gas passing through the cooler to produce a cooled desulfurized flue gas;
   a $CO_2$ absorber fluidly connected to, and downstream from, the direct contact cooler via a second conduit, wherein the absorber is configured to remove $CO_2$ from the cooled desulfurized flue gas passing through the absorber;
   a fan fluidly connected to the desulfurizer and configured to provide sufficient pressure to move flue gas through the desulfurizer, contact cooler, and absorber without the need for a second fan; and
   wherein the direct contact cooler, $CO_2$ absorber, and first and second conduits are configured to withstand desulfurized flue gas conditions that are present at an exit of the desulfurizer.

2. The system of claim 1, further comprising a boiler fluidly connected to the desulfurizer, and wherein the fan is located in the fluid pathway connecting the boiler and the desulfurizer.

3. The system of claim 1, wherein the fan is located in the second conduit.

4. The system of claim 1, where in the desulfurized flue gas conditions comprises a temperature of at least 120° F., an acidity of at least 5 pH, and a humidity of at least 50%.

5. The system of claim 1, where in the desulfurized flue gas conditions comprises a temperature of at least 180° F., an acidity of at least 2 pH, and a humidity of at least 90%.

6. The system of claim 1, further comprising a chimney fluidly connected to the absorber.

7. A gas treatment system comprising:
   a first gas conditioning unit configured to (i) remove a first constituent from a gas passing through the first gas conditioning unit and (ii) produce a substantially first-constituent-free gas;
   a second gas conditioning unit fluidly connected to, and downstream from, the first gas conditioning unit via a first conduit, wherein the second gas conditioning unit is configured to (i) modify a property of the substantially first-constituent-free gas passing through the second gas conditioning unit and (ii) produce a modified substantially first-constituent-free gas;
   an absorber fluidly connected to, and downstream from, the second gas conditioning unit via a second conduit, wherein the absorber is configured to remove a second constituent from the modified substantially constituent-free gas passing through the absorber;
   a fan fluidly connected to the first gas conditioning unit and configured to provide sufficient pressure to move a gas through the first gas conditioning unit, second gas conditioning unit, and absorber without the need for a second fan; and
   wherein the second gas conditioning unit, absorber, and first and second conduits are configured to withstand gas conditions that are present at an exit of the first gas conditioning unit.

8. The gas treatment system of claim 7, wherein the first constituent comprises a sulfur oxide.

9. The gas treatment system of claim 7, wherein the property is selected from the group consisting of density, temperature, and pressure.

10. A method of operating a plant comprising:
    adjusting a speed or vane position of a fan as a function of an operational parameter of a direct contact cooler and a $CO_2$ absorber; and
    wherein the fan is configured to provide sufficient pressure to move a flue gas through a desulfurizer fluidly connected to the direct contact cooler and $CO_2$ absorber without the need for a second fan, when the direct contact cooler and $CO_2$ absorber are in an operational state.

11. The method of claim 10, wherein the direct contact cooler and $CO_2$ absorber are configured to withstand a gas condition at an exit of the desulfurizer.

12. A method of simplifying a plant comprising:
    configuring a first fan to provide sufficient pressure to move a flue gas through a flue gas desulfurizer, direct contact cooler, and $CO_2$ absorber, without the need for a second fan;
    configuring the direct contact cooler and $CO_2$ absorber to withstand flue gas conditions present at an exit of the flue gas desulfurizer;
    optionally removing a second fan fluidly connected to the flue gas desulfurizer, direct contact cooler, and $CO_2$ absorber; and
    optionally removing a bypass conduit fluidly connecting the flue gas desulfurizer to a chimney.

* * * * *